H. Lambert.
Hide Scraper.
No. 3839. Reissued Feb 15, 1870.
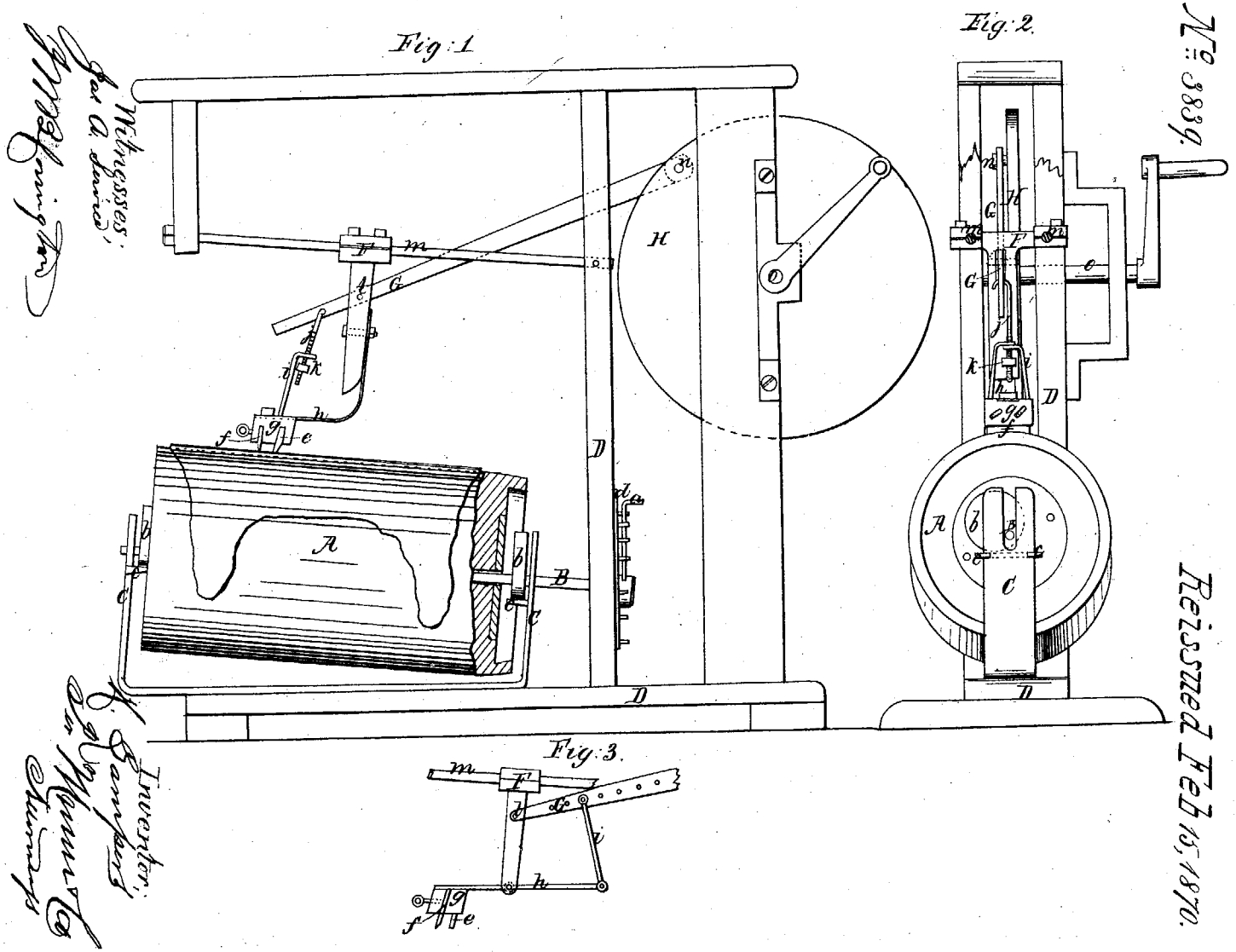
Witnesses:
Jas A. Lewis
J. M. Bissington
Inventor:
H. Lambert
per Munn & Co
Attorneys
N. PETERS, PHOTO-LITHOGRAPHER, WASHINGTON, D. C.

United States Patent Office.

HENRY LAMPERT, OF ROCHESTER, NEW YORK.

*Letters Patent No.* 60,636, *dated December* 18, 1866; *reissue No.* 3,839, *dated February* 15, 1870.

IMPROVEMENT IN APPARATUS FOR SCRAPING AND WORKING HIDES.

The Schedule referred to in these Letters Patent and making part of the same.

*To all whom it may concern:*

Be it known that I, HENRY LAMPERT, of Rochester, in the county of Monroe, and State of New York, formerly of Nunda, N. Y., have invented a new and useful "Hide-Worker;" and I do hereby declare that the following is a full, clear, and exact description thereof, which will enable others to make and use the same, reference being had to the accompanying drawings forming part of this specification, in which—

Figure 1 represents a sectional side elevation of my invention.

Figure 2 is an end view of the same.

The object of my invention, the nature of which will be understood by reference to the specification and drawings, is to provide an apparatus for scraping and dressing the hides, heretofore a slow and laborious process.

The beam A, upon which the hides lie to be worked, has a convex or cylindrical surface, and revolves easily upon the shaft B, which shaft has bearings in slotted uprights C, rising from the main frame D.

The shaft B is placed in an inclined position, and from one extremity an arm, *a*, extends, by means of which the shaft is revolved in either direction.

The eccentric disks *p* are fixed to the shaft B, and rest at their periphery on cleats *c*, secured to the posts C.

By the action of the eccentrics upon the cleats, when the shaft B is turned the beam A is raised or lowered, and in order to retain it at any desired adjustment, the arm is made to engage in the teeth of a segment, *d*, which is secured to the frame D, as shown in fig. 1.

The hides are placed on the beam and exposed to the action of the reciprocating worker *g*, to which is attached the vertically-adjustable scraper *e*.

A knife, *f*, may also be secured to *g*, and made adjustable thereon, the action of which supplements that of the scraper.

The worker *g* is attached to the cross-head F by means of the bent spring *h*, and a yoke, *i*, rises from it, which is provided with a loop to receive the screw-rod *j*.

A nut, *k*, upon the latter under the loop of the yoke *i*, serves to adjust the worker higher or lower with reference to the pitman G, as may be desired.

The upper end of the screw-rod *j* is attached to the pitman G, which is pivoted at *l* to the cross-head F. The cross-head is suspended upon suitable guide-rods attached to the upper portion of the frame D, parallel with the shaft B of the beam.

The cross-head and worker *g* are operated through the pitman G by the crank H, fixed to the shaft *a*. By the revolutions of this crank, a reciprocating motion is imparted to the worker, and at the same time it is caused to rise and fall by the vertical sweep of the pitman. Thus, by the combined motion of the cross-head and pitman, the worker *g* is made to sweep back and forth over the face of the beam A, and to descend at the front end of its stroke and rise at the back end thereof, so that it acts upon the hide when moving in one direction, and is relieved while returning in the opposite direction.

The spring *h* is so arranged that, when left to itself, it will depress the worker upon the beam or upon the the hide placed thereon; and by means of the screw-rod *j* and nut *k*, the proportion of the stroke in which the worker is elevated is regulated.

In Figure 3, I have shown a modification of the arrangement of the yoke *i* and spring *h*, in which the latter is made nearly or quite straight, and suitably connected to the lower end of the cross-head F. In this modification, the link *j* will be pivoted to the pitman somewhere between the point *l* and the crank, as shown.

If desired, two separate knives with separate springs, may be used for certain kinds of work. A hand-lever may be applied to the worker *g*, by which its pressure upon the work may be increased.

The beam A may be revolved by an automatic feeding device, if desirable, but it will generally be advantageous for a workman to operate it.

What I claim as my invention, and desire to secure by Letters Patent, is—

1. The rotary beam A, in combination with the reciprocating worker *g*, for the purposes set forth.

2. The worker *g*, provided with either the knife *f* or scraper *e*, or both, and pivoted bar *h*, in combination with a suitable device for imparting to the same an alternate reciprocating and vertical movement, substantially as described.

3. The rotary beam A, provided with a suitable vertical adjustment, for the purposes set forth.

4. The pivoted supporting bar *h*, either yielding or rigid, in combination with the cross-head F, pitman G, and link *i*, arranged to operate substantially as described.

5. The screw-rod *j* and nut *k*, in combination with the worker *g*, spring *h*, and pitman G, constructed and operating substantially as and for the purposes set forth.

HENRY LAMPERT.

Witnesses:
W. C. ROWLEY,
F. H. CLEMENT.